United States Patent [19]

Hanson

[11] 4,096,258

[45] Jun. 20, 1978

[54] METHOD FOR PREPARING A STABLE CLEAR LIQUID RELEASE AGENT

[75] Inventor: Harold Wayne Hanson, Los Angeles, Calif.

[73] Assignee: Par-Way Mfg. Co., Los Angeles, Calif.

[21] Appl. No.: 772,929

[22] Filed: Feb. 28, 1977

Related U.S. Application Data

[63] Continuation-in-part of Ser. No. 532,850, Dec. 16, 1974, abandoned, and a continuation of Ser. No. 621,309, Oct. 10, 1975, abandoned.

[51] Int. Cl.² .............................................. A23D 5/00
[52] U.S. Cl. .................................... 426/250; 426/609
[58] Field of Search ............... 426/601, 606, 607, 610, 426/612, 417, 609

[56] References Cited

U.S. PATENT DOCUMENTS

| | | | |
|---|---|---|---|
| 2,607,695 | 8/1952 | Ayers | 426/607 |
| 2,721,803 | 10/1955 | Ginn | 426/607 |
| 3,186,854 | 6/1965 | Going | 426/610 |
| 3,211,558 | 10/1965 | Baur | 426/610 |
| 3,437,492 | 4/1969 | Lensack | 426/612 |

*Primary Examiner*—Raymond N. Jones
*Assistant Examiner*—R. A. Yoncoskie
*Attorney, Agent, or Firm*—Fulwider, Patton, Rieber, Lee & Utecht

[57] ABSTRACT

A method for preparing a stable clear liquid release agent consisting of forming a uniform mixture of oils by agitating the oils at a temperature on the order of 74° C followed by uniformly chilling the mixture with agitation to at least about 25° C and working the chilled mixture. Preferably the mixture is precooled and homogenized prior to the rapid chilling step. The resultant blend of oils present a brighter and clearer appearance and is less suceptible to separation than conventionally blended oil mixtures.

9 Claims, No Drawings

METHOD FOR PREPARING A STABLE CLEAR LIQUID RELEASE AGENT

CROSS REFERENCE TO RELATED APPLICATION

The present application is a continuation-in-part of U.S. application Ser. No. 532,850, filed Dec. 16, 1974, for METHOD FOR PROCESSING ANIMAL AND VEGETABLE OILS, and is a continuation of U.S. application Ser. No. 621,309 filed Oct. 10, 1975, both of which are now abandoned in favor of this application.

BACKGROUND OF THE INVENTION

The present invention relates to the processing of animal and vegetable oils and more particularly relates to a method for blending mixtures of oils to from a stable clear liquid release agent.

Mixtures of animal and vegetable oils are widely used in numerous products such as salad oils, cooking and baking oils, release coatings for baking and cooking pans and the like. Such oil mixtures, which may include additives to prevent spattering during cooking, emulsifiers, colorants and flavorants are normally prepared by blending the ingredients at an elevated temperature and packaging or storing the blend directly from the blending operation. The blended oil mixture is allowed to cool slowly to ambient temperature.

In accordance with the conventional prior art methods of blending animal and vegetable oils, the cooling of the blended oils occurs unevenly with the greatest rate of cooling occurring at the interface of the container and oil while the center portion of the oil cools most slowly. Thus, any tendency for the components to separate will occur during the slow cooling period and even in the case where gross separation of components does not occur, resultant finished products may tend to be slightly dull in appearance.

In view of the fact that blended oils are normally examined for clarity and brightness by customers, either during quality control tests when sold in bulk or by viewing in clear transparent containers at the retail level, any tendency towards lack of brightness in the finished product is highly undesirable.

SUMMARY OF THE INVENTION

In accordance with the present invention blends of animal and vegetable oils are subjected to a chilling step after high temperature blending and prior to packaging to uniformly bring the blend temperature to at least 25° C. Following chilling, the blend is worked by agitation to produce a thoroughly mixed, uniform release agent. The finished stable clear liquid release agent is brighter in appearance than conventionally blended oils thereby presenting a superior, more marketable appearance and insuring non-separation of the components of the blend which may occur due to slow cooling of the oil blend from the blending temperature. Moreover, it has been found that oils prepared as release agents in accordance with the invention have better releasing properties than oils of the same composition but prepared without the chilling and agitating step. In addition it is unnecessary to compensate for volume changes when packaging oils blended in accordance with the present invention since the product is at room temperature prior to packaging.

These and other advantages and features of the present invention will be apparent from the following detailed description of the invention and the claims appended thereto.

DESCRIPTION OF THE INVENTION

The present invention resides in an improved process for blending mixtures including animal and vegetable oils so that the appearance of the final product is improved, particularly in its brightness or clarity and its effectiveness as a release agent is also improved. It is believed that oil mixtures treated in accordance with the invention have a reduced tendency for the components to separate thereby resulting in a brighter clearer and more effective product than achieved by the same blend of oils processed by conventional methods. It is believed that even with highly miscible ingredients, temperature differentials within the blended mass caused by uneven cooling of the mass after blending will result in a slight separation of ingredients which will detract from the appearance and effectiveness of the product.

In accordance with the present invention, the oil blends treated comprise a major portion of an animal or vegetable fat which is liquid at room temperature. Such oil blends are primarily utilized as release agents for cooking and baking utensils and the like. However, oil blends prepared by the method of the invention are not restricted to edible oil blends and may be utilized in the preparation of blends of drying oils and the like. Oil blends as used herein, however, are to be distinguished from the liquid suspensions, semi-solid, plastic, or solid fats which are conventionally termed as butters, fats, shortenings or tallows, which present somewhat different problems in processing.

The fatty oils processed by the invention are fatty acid glycerides of medium and high unsaturation such as for example: oleiclinoleic acid oils such as palm oil, olive oil, cottonseed oil, peanut oil, sunflower seed oil, corn oil, sesame oil; erucic acid oils, such as rapeseed oil, and mustard seed oil; lauric acid oils such as coconut and palm-kernel oil; linolenic acid oils such as soybean oil; and marine oils such as herring, menhaden, pilchard and fish liver oils. Of these oils, palm oil, coconut oil and palm kernal oil are normally solids between about 20° C. and about 25° C. (room temperature).

It should be noted that fatty oils useful in the present invention may be prepared synthetically and need not be derived solely from natural sources. Accordingly, as used herein, the term "fatty oils" and "animal and vegetable oils" is intended to cover fatty acid glycerides which are liquid at room temperature and which normally are derived from natural sources but which may also be synthetically prepared.

In addition to a major proportion of fatty oil, the blends may optionally include minor proportions of fat soluble additives designed to provide or promote desirable properties in the finished fatty oil blend. For example, anti-oxidants such as the tocophenols may be added to prevent rancidity. Emulsifying agents, agents for the prevention of bleeding and spattering, coloring agents, flavoring agents and the like may also be incorporated in minor proportions in the oil blend. A highly useful additive is soybean oil lecithin which serves as an anti-oxidant, anti-bleeding and spattering agent and emulsifying agent.

In accordance with conventional practice the fatty oils and additives are blended together at temperatures above room temperature. The blends may be prepared at temperatures of between 65° to about 260° C depending upon the nature of the fatty oils and additives. Preferably the blending temperature is maintained as low as possible to reduce the expense of heating and to avoid any thermal degradation of the blend ingredients. The purpose of forming the blend at elevated temperatures is to reduce the viscosity of the fatty oils thereby to lower power requirements for the mixing and to aid in forming a substantially uniform mixture.

In accordance with the present invention, the heated oil blend is subjected to a chilling step to uniformly reduce the temperature of the oil blend to a temperature of between about 25° and 20° C. Preferably the chilling step is preceded by at least one precooling step to reduce the blend temperature to about 60° C. Although precooling of the blended fatty oils is not essential, it has been found that the chilling step is most efficiently and quickly carried out when the blend being chilled is first precooled.

The precooling step need not be rapid and as will be seen in the Example can be carried out simply by pumping the fatty oil blend through the blending system until the temperature has been reduced to the desired level. There is little danger of the formation of cloud in the blend during precooling since the blend is constantly agitated by the pumping action and cooling is substantially uniform, if not rapid.

The chilling step is carried out under conditions which will effect the uniform cooling of the blended oil product to a temperature of between about 25° and 20° C. Accordingly, the oil blend is chilled in a suitable heat exchanger through which a conventional coolant, such as water or silicone fluid, is circulated. Uniform chilling is achieved by mixing or agitating the oil blend to avoid the formation of undesirable temperature gradients in the blend. Preferably the oil blend is chilled as rapidly as is permitted by the equipment utilized. However, uniformity of chilling is of greater importance than the rate of chilling.

A preferred heat exchanger for the chilling step is a device commonly marketed by the Girdler Corporation under the trademark "Votator." This device comprises a jacketed tube having disposed therein a rotatable shaft with outwardly extending scrapers or wipers, the tips of which contact the wall of the tube bore. The shaft diameter is about three quarters of the tube diameter so that a relatively confined annular space is defined between the shaft and the tube. During operation the blend is pumped through the annular space while the shaft is rotating at high speed. While passing through the annular space, the blend is forced into a relatively thin layer which results in substantial uniform and rapid heat loss. The wipers constantly agitate the blend and wipe films of the blend from the wall of the tube bore. Coolant is pumped through the tube jacket to remove heat from the blend passing through the tube bore resulting in a rapid and uniform heat transfer from the fatty oil blend.

Although the "Votator" represents the preferred means for chilling the fatty oil blend, it should be clear that other types of heat exchange mixers are used to chill the fatty oil blend. For example, propeller mixers, colloid mills, homogenizers, turbomixers and the like may be utilized so long as the mixing vessel is adapted for cooling the fatty oil blend contained therein to about 25° C. It is preferred that the mixing apparatus be of the continuous type as contrasted to batch type and for this additional reason the "Votator" is highly preferred.

Following the chilling step, the oil blend is subjected to a working step at its chilled temperature. The working step is accomplished by agitating the now chilled oil blend to throughly mix the oil blend to produce the finished product. Without the final working operation, the separate batches or increments of chilled oil blend tend to be somewhat segregated and uniformity of appearance and effectiveness of the final product is adversely affected.

Although not essential, it is preferred to subject the fatty oil blend to a homogenization step prior to the final chilling operation. If the blend is precooled, homogenization is advantageously carried out between the precooling and chilling steps. Conventional homogenizing equipment is employed in the homogenization step.

The following example illustrates the manner in which a fatty oil blend is prepared in accordance with the invention. Although the example describes a specific fatty oil blend and specific processing temperatures, the invention is not to be construed as being limited to the particular embodiment set forth therein.

EXAMPLE

A fatty oil blend for use as a release agent for baking utensils was prepared in accordance with the following formula.

| | |
|---|---|
| [1]Refined Soybean Oil | 2786 lbs. |
| [2]Coconut oil | 1858 lbs. |
| Lecithin, double bleached | 250 lbs. |
| BEX Butter Derivative | 2.5 lbs. |
| Beta-Carotene | 4 oz. |

[1]Free Fatty Acid Content 0.04%
[2]Free Fatty Acid Content 0.05% max.
[2]Iodine value 8 to 11
[2]Moisture .05% max.

Approximately 50 weight % of the soybean oil and coconut oil were metered into a blending tank provided with an electrically driven impeller for mixing the oils. Immersion heaters were disposed in the blending tank and were activated to heat the oil contained in the tank. During heating the oil was mixed by the impeller. Heating was continued until the oil temperature reached about 70° C, at which point the immersion heaters were turned off.

The lecithin was introduced into the heated oil and mixed for about 10 minutes. The balance of coconut and soybean oil was then charged to the blending tank followed immediately by the butter derivative and the beta-carotene. Mixing of the entire batch was continued for about 3 minutes. After mixing, the batch temperature had dropped to about 66° C. A 55 gallon sample was removed, homogenized in a 2-stage homogenizer in the manner described hereinafter and placed in a 55 gallon drum and stored while still warm in accordance with conventional practice.

Following mixing, the remaining oil mixture was precooled by circulating the mixture between the blending tank and a pre-cooler consisting of heat exchange coils immersed in cold water until the temperature of the material had dropped to about 60° C. Approximately 10 minutes was required for precooling.

The precooled blend was then passed through a 2-stage homogenizer with the first stage set at 1000 psi and the second stage at 3500 psi and returned to the pre-cooler where the temperature of the homogenized blend was reduced to about 38° C.

From the pre-cooler, the blend was pumped through the "Votator" where the blend was agitated and rapidly chilled from about 38° to about 21° C. After chilling, the oil blend was introduced into a high speed paddle agitator (Girdler Co. B Unit) and worked at high speed agitation to whip and thoroughly mix the oil blend. Following working the oil blend was packaged in 55 gallon drums.

After the 55 gallon sample, which had been packaged while still hot, had cooled to room temperature, a smaller sample was removed from the drum and placed in a clear, transparent container and visually compared to similar samples removed from the drums containing chilled product. The samples of chilled product were clear and brilliant and presented a brighter appearance than the conventionally processed product which was clear but which, in comparison to the chilled product, was not as brilliant.

The release properties of both the oil blend prepared by conventional practice and the blend prepared according to the invention are checked by coating muffin pans with a release coating of each of the oil blends and baking muffins in the pans at 400° F. At completion of baking, the pans are inverted. With muffin pans coated with the blend prepared in accordance with the invention, that is with chilling and working, all the muffins are released and fall out of the pan. With pans using the oil blend prepared in the conventional manner, as many as one half of the muffins remain in the pan when it is inverted indicating that the conventionally processed oil blend is not as effective a release agent as the oil blend of the same composition but processed according to the invention.

The above Example utilizes a precooling step prior to the chilling step, however, good results are achieved when the precooling step is eliminated. In such a case the oil blend is homogenized after blending without any deliberate cooling. The homogenized blend is circulated through the "Votator" until the temperature is reduced to at least about 25° C. It has been found that a given quantity of oil blend will require 2 or more passes before the temperature is reduced to the desired level but it should be noted that the temperature drop obtained with each pass is rapid and the blend is uniformly chilled even where several passes are necessary. Where batch type coolers are utilized without precooling the blend, chilling is accomplished by increasing the holding time in the cooler until the blend temperature is reduced to the desired level of between about 25° and 20° C.

From the foregoing it will be seen that forming an oil blend utilizing uniform chilling and working the blend after chilling produces a final product having improved brilliance and release properties as contrasted to blends of the same composition but prepared in the conventional manner. While the process has been illustrated in connection with a preferred embodiment it should be clear that modifications of the process can be made without departing from the spirit or scope of the invention as defined in the appended claims.

I claim:

1. A method for preparing a stable clear liquid release agent comprising a liquid blend of fatty oils the method comprising the steps of blending about 57 percent by weight of soybean oil, about 38 percent by weight of coconut oil and about 5 percent by weight of lecithin at a temperature of at least 65° C. to form a substantially uniform blend, chilling said blend uniformly to a temperature between about 20° to 25° C. to form a chilled blend, and working said chilled blend by agitation to provide a clear liquid release agent.

2. The method of claim 1 wherein said oil blend further includes an effective amount of a flavor additive and a colorant.

3. A stable clear liquid release agent comprising the fatty oil blend produced by the method of claim 1.

4. A fatty oil blend prepared by the method of claim 1 consisting essentially of:

Soybean Oil: about 57 wt. %
Coconut Oil: about 38 wt. %
Lecithin: about 5 wt. % and further including an effective amount of color and flavor additives.

5. The method of claim 1 further including the steps of cooling to an intermediate temperature and homogenizing said blend prior to the chilling step.

6. The method of claim 1 wherein said fatty oils are heated to a temperature of about 74° C. during said blending step.

7. The method of claim 5 wherein said blend is cooled to about 38° C. prior to said homogenizing step.

8. The method of claim 1 wherein said blend is chilled by passing said blend through an annular space defined between the bore of a jacketed tube and a rotating shaft with outwardly extending scrapers, the tips of which contact the wall of said bore for removing films of blended oil from the wall of said bore, said jacketed tube being cooled for the removal of heat from said blend which is formed by said annular space into a relatively thin layer for the substantially uniform removal of heat from said layer of said mixture.

9. The method of claim 1 wherein said chilled blend is worked by high speed agitation.

* * * * *